United States Patent
Nagahara et al.

(10) Patent No.: US 6,949,607 B2
(45) Date of Patent: Sep. 27, 2005

(54) THERMOPLASTIC RESIN COMPOSITION AND ITS MOLDED ARTICLES

(75) Inventors: Tadashi Nagahara, Tokyo (JP); Masanori Suzuki, Tokyo (JP); Kazuki Iwai, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 22 days.

(21) Appl. No.: 10/436,366

(22) Filed: May 13, 2003

(65) Prior Publication Data

US 2004/0006178 A1 Jan. 8, 2004

Related U.S. Application Data

(63) Continuation-in-part of application No. 10/022,828, filed on Dec. 20, 2001, now abandoned.

(30) Foreign Application Priority Data

Dec. 27, 2000 (JP) ........................................ 2000-399066

(51) Int. Cl.[7] ......................... C08F 279/04; C08L 33/20
(52) U.S. Cl. ..................... 525/230; 525/233; 525/234; 525/242; 525/69; 525/70; 525/316
(58) Field of Search ................................. 525/230, 233, 525/234, 242, 69, 70, 316

(56) References Cited

U.S. PATENT DOCUMENTS

| 4,187,260 A | | 2/1980 | Kruse et al. ................... 25/263 |
| 5,569,709 A | | 10/1996 | Sue et al. .................... 525/316 |
| 5,932,655 A | * | 8/1999 | Auclair et al. ................ 525/71 |

* cited by examiner

*Primary Examiner*—James J. Seidleck
*Assistant Examiner*—Olga Asinovsky
(74) *Attorney, Agent, or Firm*—Nixon & Vanderhye P.C.

(57) ABSTRACT

Thermoplastic resin compositions containing a rubber-reinforced thermoplastic resin (A) obtained by graft polymerizing a monomeric mixture (b) in the presence of a rubber-like polymer (a), and a copolymer (B) obtained by polymerizing an aromatic vinyl compound, a vinyl cyanide compound and optionally other copolymerizable monomeric compound(s), which copolymer (B) being a mixture of a copolymer (B1) having $M_w$ of 50,000 to 110,000 and a copolymer (B2) having $M_w$ of 115,000 to 400,000. The content of the rubber-like polymer (a) content in the rubber-reinforced thermoplastic resin (A) is 10 to 25% by weight, the vinyl cyanide monomeric unit in the acetone soluble matter is 15 to 40% by weight, and the ratios of Mw to $M_n$ and $M_Z$ to $M_n$ of the acetone soluble matter being 2 to 5 and 5 to 11, respectively.

7 Claims, No Drawings

THERMOPLASTIC RESIN COMPOSITION AND ITS MOLDED ARTICLES

CROSS REFERENCE TO RELATED APPLICATION

This application is a continuation-in-part of application Ser. No. 10/022,828, filed Dec. 20, 2001 now abandoned, the entire content of which is hereby incorporated by reference in this application.

BACKGROUND OF THE INVENTION

The present invention relates to a thermoplastic resin composition, more particularly relates to a thermoplastic resin of which the molded articles show good plate adhesion to their surfaces, and also have excellent coating properties and improved impact resistance.

The molded articles of rubber-reinforced thermoplastic resins such as ABS resins are often subjected to secondary works such as plating, coating, sputtering, ion plating, etc. Particularly, in the case of plating, if a molded article is simply plated, there may not be obtained sufficient adhesive strength between the deposit and the surface of the molded article, so that the deposit releases easily from the surface in use. For enhancing adhesive strength of the deposit, a method is known in which the surface of the molded article to be plated is subject to an oxidation treatment to decompose rubber material present in the molded article surface layer and then the article surface is etched to form fine indents, after which plating is conducted. According to this method, it is supposed possible to enhance adhesive strength of the deposit by anchor effect because the deposit bites into the indents. Practically, however, such fine indents formed by etching are deformed during plating, and the desired adhesive strength can not be obtained.

Further, there is a problem that by the etching the mechanical strength, particularly impact resistance of the molded articles is deteriorated. Thus, there is a demand to provide a resin composition having a good balance of plate adhesion and mechanical properties when processed into a molded article.

Further, in coating of the articles molded from conventional rubber-reinforced thermoplastic resins such as ABS resins, there is a problem of improper adhesion of the coating film, color shading of the coated surface due to suction of the thinner into the molded article and consequent impairment of its visual appearance.

As a result of the present inventors' earnest study to solve the above problem, it has been found that the articles molded from a rubber-reinforced thermoplastic resin composition having a specific ratio of weight-average molecular weight $M_w$ to number-average molecular weight $M_n$ of the acetone soluble matter ($M_w/M_n$ ratio) and a specific ratio of Z-average molecular weight $M_Z$ to number-average molecular weight $M_n$ of the acetone soluble matter ($M_Z/M_n$ ratio) show good plate adhesion on their surface and also have excellent coating properties and mechanical strength, typically impact resistance. The present invention has been attained on the basis of the above findings.

SUMMARY OF THE INVENTION

An object of the present invention is to provide a thermoplastic resin composition, specifically comprising a rubber-reinforced thermoplastic resin such as ABS resin, whose molded articles have good plate adhesion as well as excellent coating properties and mechanical strength such as impact resistance.

To attain the above aim, in the first aspect of the present invention, there is provided a thermoplastic resin composition comprising a rubber-reinforced thermoplastic resin (A) obtained by graft polymerizing a monomeric mixture (b) comprising an aromatic vinyl compound, a vinyl cyanide compound and optionally other copolymerizable monomeric compound(s) in the presence of a rubber-like polymer (a), the content of the rubber-like polymer (a) in the rubber-reinforced thermoplastic resin (A) being 10 to 25% by weight, the content of the vinyl cyanide monomeric unit in the acetone soluble matter being 15 to 40% by weight, the ratio of weight-average molecular weight $M_w$ to number-average molecular weight $M_n$ of said acetone soluble matter ($M_w/M_n$ ratio) being 2 to 5, and the ratio of Z-average molecular weight $M_Z$ to number-average molecular weight $M_n$ of said acetone soluble matter ($M_Z/M_n$ ratio) being 5 to 11.

In the second aspect of the invention, there is provided a thermoplastic resin composition comprising:

a rubber-reinforced thermoplastic resin (A) obtained by graft polymerizing a monomeric mixture (b) comprising an aromatic vinyl compound, a vinyl cyanide compound and optionally other copolymerizable monomeric compound(s) in the presence of a rubber-like polymer (a), and a copolymer (B) obtained by polymerizing an aromatic vinyl compound, a vinyl cyanide compound and optionally other copolymerizable monomeric compound(s), the content of the rubber-like polymer (a) in the rubber-reinforced thermoplastic resin (A) being 10 to 25% by weight, the content of the vinyl cyanide monomeric unit in the acetone soluble matter being 15 to 40% by weight, the ratio of weight-average molecular weight Mw to number-average molecular weight $M_n$ of said acetone soluble matter ($M_w/M_n$ ratio) being 2 to 5, and the ratio of Z-average molecular weight $M_Z$ to number-average molecular weight $M_n$ of said acetone soluble matter ($M_Z/M_n$ ratio) being 5 to 11.

In the second aspect of the invention, there is provided a thermoplastic resin composition comprising:

a rubber-reinforced thermoplastic resin (A) obtained by graft polymerizing a monomeric mixture (b) comprising an aromatic vinyl compound, a vinyl cyanide compound and optionally other copolymerizable monomeric compound(s) in the presence of a rubber-like polymer (a), and a copolymer (B) obtained by polymerizing an aromatic vinyl compound, a vinyl cyanide compound and optionally other copolymerizable monomeric compound(s), the content of the rubber-like polymer (a) in the rubber-reinforced thermoplastic resin (A) being 10 to 25% by weight, the content of the vinyl cyanide monomeric unit in the acetone soluble matter being 15 to 40% by weight, the ratio of weight-average molecular weight Mw to number-average molecular weight $M_n$ of said acetone soluble matter ($M_w/M_n$ ratio) being 2 to 5, the ratio of Z-average molecular weight $M_Z$ to number-average molecular weight $M_n$ of said acetone soluble matter ($M_Z/M_n$ ratio) being 5 to 11, said copolymer (B) comprising a mixture of a copolymer (B1) having $M_w$ of 50,000 to 110,000 and a copolymer (B2) having $M_w$ of 115,000 to 400,000, and said copolymers (B1) and (B2) are obtained by polymerizing an aromatic vinyl compound, a vinyl cyanide compound and optionally other copolymerizable monomeric compound(s).

In the fourth aspect of the invention, there is provided molded article comprising the thermoplastic resin composition as defined in the first aspect, said molded article being plated or coated.

In the fifth aspect of the invention, there is provided a molded article comprising the thermoplastic resin composition as defined in the second aspect, said molded article being plated or coated.

In the sixth aspect of the invention, there is provided a molded article comprising the thermoplastic resin composition as defined in the third aspect, said molded article being plated or coated.

DETAILED DESCRIPTION OF THE INVENTION

The present invention is described in detail below. The thermoplastic resin composition according to the present invention comprises a rubber-reinforced thermoplastic resin (A) obtained by graft polymerizing a monomeric mixture (b) comprising an aromatic vinyl compound, a vinyl cyanide compound and if necessary other copolymerizable monomeric compound(s) in the presence of a rubber-like polymer (a), or the said rubber-reinforced thermoplastic resin (A) and a copolymer (B) obtained by polymerizing a vinyl compound, a vinyl cyanide compound and if necessary other copolymerizable monomeric compound(s).

As the rubber-like polymer (a), there can be used conjugated diene (co)polymers such as polybutadiene, styrene-butadiene random copolymer, styrene-butadiene block copolymer, butadiene-acrylonitrile copolymer, isobutylene-isoprene copolymer, styrene-butadiene-styrene block copolymer and styrene-isoprene-styrene block copolymer; hydrogenated products of these conjugated diene (co)polymers; ethylene-propylene-(non-conjugated diene) copolymer; ethylene-butene-1-(non-conjugated diene) copolymer; polyurethane rubber; acrylic rubber; silicone rubber and the like. These (co)polymers can be used alone or as a mixture of two or more. Of these (co)polymers, polybutadiene, styrene-butadiene copolymer, acrylic rubber, ethylene-propylene-(non-conjugated diene) copolymer, hydrogenated diene (co)polymers and silicone rubber are preferred.

In the thermoplastic resin composition of the present invention, the rubber-like polymer (a) is usually used in a particulate state. In this case, the average particle size of the rubber-like polymer (a) is preferably 150 to 500 nm, more preferably 150 to 450 nm, even more preferably 200 to 400 nm. When the average particle size of the polymer (a) is too small, the impact resistance of the molded article of the resin composition may be deteriorated. On the other hand, when the average particle size is too large, the plate adhesion and coating properties of the molded article may be deteriorated.

The gel fraction of the rubber-like polymer (a) is preferably not less than 40% by weight, more preferably 50 to 99% by weight, even more preferably 60 to 95% by weight. A too large gel fraction is liable to deteriorate plate adhesion and coating properties of the molded article while a too small gel fraction tends to reduce impact resistance.

The gel fraction of the rubber-like polymer (a) is determined by a method in which 1 g of the rubber-like polymer is added to 100 ml of toluene, the mixture being allowed to stand at room temperature for 48 hours and then filtered by a 100-mesh metal gauze, then toluene is removed from the dispersed filtrate, the residue being dried to determine the toluene-soluble matter, and the gel fraction is calculated from the following equation:

$$\text{Gel fraction } (\%) = [1 (g) - \text{toluene soluble matter } (g)] \times 100$$

As the aromatic vinyl compound in the monomeric mixture (b) used for the preparation of rubber-reinforced thermoplastic resin (A), there can be exemplified styrene, α-methylstyrene, o-methylstyrene, p-methylstyrene, t-methylstyrene, vinyltoluene, methyl-α-methylstyrene and divinylbenzene. Of these compounds, styrene and α-methylstyrene are preferred.

The copolymerization percentage of the aromatic vinyl compound is preferably 55 to 90% by weight, more preferably 60 to 85% by weight based on the overall amount of the monomeric mixture (b). When the copolymerization percentage of the aromatic vinyl compound is too low, the thermoplastic resin composition may be poor in thermal stability and moldability. When the copolymerization percentage is too high, the molded article of the produced resin may be deteriorated in coating properties.

As the vinyl cyanide compound in the monomeric mixture (b), acrylonitrile and methacrylonitrile are exemplified, and acrylonitrile is preferred. The copolymerization percentage of the vinyl cyanide compound is preferably 10 to 45% by weight, more preferably 15 to 40% by weight, based on the overall amount of the monomeric mixture (b). When the copolymerization percentage of the vinyl cyanide compound is too low, the coating properties of the molded article may be poor. When the copolymerization percentage of the vinyl cyanide compound is too high, the thermal stability and moldability of the produced resin may be deteriorated.

The monomeric mixture (b) may optionally contain other copolymerizable monomeric compounds such as alkyl (meth)acrylates, maleimide-based compounds, unsaturated acids, unsaturated compounds containing acid anhydride group(s), unsaturated compounds containing epoxy group(s), and unsaturated compounds containing hydroxyl group(s).

"Alkyl (meth)acrylates" mentioned as an example of other polymerizable monomeric compounds include acrylic esters such as methyl acrylate, ethyl acrylate, propyl acrylate, butyl acrylate, hexyl acrylate, 2-ethylhexyl acrylate and cyclohexyl acrylate, and methacrylic esters such as methyl methacrylate, ethyl methacrylate, propyl methacrylate, butyl methacrylate and 2-ethylhexyl methacrylate. Of these compounds, methyl methacrylate, butyl methacrylate and butyl acrylate are preferred.

"Maleimide-based compounds" mentioned as an example of other polymerizable monomeric compounds include maleimde, N-methylmaleimide, N-butylmaleimide, N-phenylmaleimide, N-(p-methylphenyl)maleimide, and N-cyclohexylmaleimide. Of these compounds, N-phenylmaleimide and N-cyclohexylmaleimide are preferred.

"Unsaturated acids" mentioned as an example of other polymerizable monomeric compounds include acrylic acid and methacrylic acid.

"Unsaturated compounds containing acid anhydride groups" mentioned as an example of other polymerizable monomeric compounds include maleic anhydride, itaconic anhydride and citraconic anhydride, of which maleic anhydride is preferred.

"Unsaturated compounds containing epoxy groups" mentioned as an example of other polymerizable monomeric compounds include glycidyl methacrylate and acrylglycidyl ether, glycidyl methacrylate being preferred.

"Unsaturated compounds containing hydroxyl groups" mentioned as an example of other polymerizable monomeric compounds include 3-hydroxy-1-propene, 4-hydroxy-1-butene, cis-4-hydroxy-2-butene, trans-4-hydroxy-2-butene, 3-hydroxy-2-methyl-1-propene, and 2-hydroxyethyl methacrylate. Of these compounds, 2-hydroxyethyl methacrylate is preferred.

These copolymerizable monomeric compounds may be used alone or as a mixture of two of more. The copolymerization percentage of these compounds is preferably 0 to 35% by weight, more preferably 0 to 25% by weight, based on the overall amount of the monomeric mixture (b).

The graft ratio of the rubber-reinforced thermoplastic resin (A) is preferably not less than 20%, more preferably 25 to 150%, even more preferably 30 to 100%.

The "graft ratio" (%) referred to herein is the ratio of the monomeric mixture (b) grafted to the rubber-like polymer (a), and is determined from the following equation:

Graft ratio (%)=100×(T−S)/S wherein T is the weight of the insoluble matter obtained by charging 1 g of the rubber-reinforced thermoplastic resin (A) into 20 ml of acetone, shaking the solution at room temperature by a shaker, and centrifuging the solution at a speed of 23,000 rpm for 60 minutes to separate the soluble matter and the insoluble matter, and S is the weight of the rubber-like polymer in 1 g of the rubber-reinforced thermoplastic resin (A).

If the graft ratio is too low, the molded article tends to have poor plate adhesion and coating properties, while if the graft ratio is too high, the molded article tends to lack surface gross.

The graft ratio (%) can be controlled by changing the kind and amount of the polymerization initiator, chain transfer agent, emulsifier, solvent, etc., and other factors such as polymerization time and polymerization temperature when forming the rubber-reinforced thermoplastic resin (A) by polymerization.

Rubber-reinforced thermoplastic resin (A) can be produced by graft polymerizing a monomeric mixture (b) comprising an aromatic vinyl compound and a vinyl cyanide compound as essential components in the presence of a rubber-like polymer (a). The preferred polymerization methods in the present invention are emulsion polymerization, suspension polymerization, solution polymerization and bulk polymerization, in each of which a radical polymerization initiator is used. Especially preferred is emulsion polymerization. In emulsion polymerization, there are used, beside a radical polymerization initiator, a chain transfer agent (molecular weight modifier), emulsifier and water.

The rubber-like polymer (a) and the monomeric mixture (b) used for producing the rubber-reinforced thermoplastic resin (A) may be polymerized by supplying the whole monomeric mixture (b) at one time in the presence of the entire amount of the rubber-like polymer (a) or may be polymerized by supplying the monomeric mixture (b) in portions or continuously. A combination of these methods is also effective. Further, the whole amount or part of the rubber-like polymer (a) may be supplied in the course of polymerization of the monomeric mixture (b).

As the radical polymerization initiator, there can be used redox type initiators comprising a combination of an organic hydroperoxide such as cumene hydroperoxide, diisopropylbenzene hydroperoxide, paramenthane hydroperoxide, etc., and a reducing agent such as saccharated pyrophosphoric acid formulation, sulfoxylate formulation, etc., persulfates such as potassium persulfate, and peroxides such as benzoyl peroxide (BPO), lauroyl peroxide, t-butyl peroxylaurate, t-butyl peroxymonocarbonate, etc. The polymerization initiator may be added all at one time or continuously to the polymerization system. Its amount added is usually 0.1 to 1.5% by weight, preferably 0.2 to 0.7% by weight, based on the total amount of the monomeric mixture (b).

As the chain transfer agent, mercaptans such as octylmercaptan, n-dodecylmercaptan, t-dodecylmercaptan, n-hexylmercaptan, n-hexadecylmercaptan, n-tetradecylmercaptan and t-tetradecylmercaptan, and dimers such as terpinolene and α-methylstyrene can be exemplified. These chain transfer agents may be used alone or as a mixture of two or more in an amount of usually 0.05 to 2.0% by weight based on the overall amount of the monomeric mixture (b).

As the emulsifier, there can be used anionic surfactants, for example, sulfuric esters of higher alcohols, alkylbenzenesulfonates such as sodium dodecylbenzenesulfonate, aliphatic sulfonates such as sodium laurate, higher aliphatic carboxylates and phosphate type, and nonionic surfactants such as polyethylene glycol alkyl ester type or alkyl ether type. These compounds may be used alone or as a mixture of two or more in an amount of usually 0.3 to 5% by weight based on the overall amount of the monomeric mixture (b).

In case of preparing the rubber-reinforced thermoplastic resin (A) by emulsion polymerization, usually a powder obtained by coagulating the solution with a coagulant is purified by washing with water and then drying. As the coagulant, inorganic acids such as calcium chloride, magnesium sulfate, magnesium chloride, sodium chloride, etc., and acids such as sulfuric acid, hydrochloric acid, etc., can be used.

The intrinsic viscosity [η] of the acetone soluble matter in the rubber-reinforced thermoplastic resin (A) is preferably 0.2 to 1 dl/g, more preferably 0.2 to 0.9 dl/g (measured at 30° C. in methyl ethyl ketone).

The intrinsic viscosity [η] can be controlled by suitably selecting the kind and amount of the chain transfer agent and the polymerization initiator used in graft polymerization, and other factors such as polymerization temperature.

The thermoplastic resin composition according to the second aspect comprises the rubber-reinforced thermoplastic resin (A) and a copolymer (B) that can be obtained by polymerizing an aromatic vinyl compound, a vinyl cyanide compound and if necessary other copolymerizable monomeric compound(s).

As the aromatic vinyl compound, vinyl cyanide compound and optional copolymerizable monomeric compound(s) used for the preparation of the copolymer (B), it is possible to use those exemplified above. Also, copolymer (B) may be a combination of a plural number of polymers.

The copolymerization percentage of the aromatic vinyl compound in the copolymer (B) is preferably 50 to 85% by weight, more preferably 60 to 80% by weight. When the copolymerization percentage the moldability and thermal stability of the produced resin composition may be poor. When the copolymerization percentage of the aromatic vinyl compound is too high, the coating properties of the molded article of the resin composition may be poor.

The copolymerization percentage of the vinyl cyanide compound in the copolymer (B) is preferably 15 to 50% by weight, more preferably 20 to 40% by weight. When the copolymerization percentage of the vinyl cyanide compound is too low, the coating properties of molded article may be poor. When the copolymerization percentage of the vinyl cyanide compound is too high, the thermal stability and moldability of resin composition may be poor.

The copolymerization percentage of the optionally used other copolymerizable monomeric compound(s) in the copolymer (B) is preferably 0 to 35% by weight, more preferably 0 to 20% by weight.

Copolymer (B) can be obtained by, for instance, solution polymerization, emulsion polymerization or suspension polymerization.

Copolymer (B) is soluble in acetone and the intrinsic viscosity [η] of its acetone soluble matter (measured at 30° C. in methyl ethyl ketone) is preferably 0.1 to 1 dl/g, more preferably 0.12 to 0.9 dl/g. Intrinsic viscosity [η] can be controlled in the same way as in the case of rubber-reinforced thermoplastic resin (A).

In the thermoplastic resin composition comprising the rubber-reinforced thermoplastic resin (A) or in the thermoplastic resin composition comprising the rubber-reinforced thermoplastic resin (A) and the copolymer (B), the content of rubber-like polymer (a) is preferably 12 to 25% by weight, more preferably 13 to 22% by weight. When the content of rubber-like polymer (a) is too small, the impact strength thereof may be poor. When the content of rubber-like polymer (a) is too large, there are formed too many indents by etching in the plating step, resulting in reduced impact strength of the molded article.

In the case of the thermoplastic resin composition comprising a rubber-reinforced thermoplastic resin (A) and a copolymer (B), the content of rubber-like polymer (a) in the thermoplastic resin composition can be adjusted by changing the rubber-like polymer content in rubber-reinforced thermoplastic resin (A), the rubber-like polymer content in copolymer (B), and the mixing ratios of rubber-reinforced thermoplastic resin (A) and copolymer (B). Also, the above content of rubber-like polymer can be attained by only the presence of rubber-reinforced thermoplastic resin (A).

In the present invention, the content of vinyl cyanide monomeric units in the acetone soluble matter of the thermoplastic resin or the thermoplastic resin composition is 15 to 40%, preferably 18 to 40%, more preferably 26 to 35%. When the content of vinyl cyanide monomeric units is too small, the molded article may not have satisfactory chemical resistance. When the content of vinyl cyanide monomeric units is too large, the molded article may be poor in heat discoloration resistance.

In the present invention, the relationship among the weight-average molecular weight $M_w$, number-average molecular weight $M_n$ and Z-average molecular weight $M_Z$ of the said acetone soluble matter is important.

The ratio of weight-average molecular weight $M_w$ to number-average molecular weight $M_n$ of the said acetone soluble matter ($M_w/M_n$ ratio) is 2 to 5, preferably 2 to 4.5, more preferably 2 to 4. When the $M_w/M_n$ ratio is less than 2 or exceeds 5, the molded article may be poor in plate adhesion and coating properties. The $M_w/M_n$ ratio is generally referred to as the degree of dispersion, and is an index showing the extent of molecular weight.

The ratio of Z-average molecular weight $M_Z$ to number-average molecular weight $M_n$ of the said acetone soluble matter ($M_Z/M_n$ ratio) is 5 to 11, preferably 5.5 to 11, more preferably 6 to 10.5. When the $M_Z/M_n$ ratio is too small or too large, the molded article may be poor in plate adhesion and coating properties. Here, this $M_Z/M_n$ ratio shows a measure of nonuniformity of molecular weight. $M_w$, $M_n$ and $M_Z$ are explained in, for example "Revised Chemistry of Polymer Syntheses" (published by Kagaku Dojin K K, 1981), and are usually determined by gel permeation chromatography (GPC). The determination conditions are stated in the Examples shown later.

$M_n$, $M_w$ and $M_z$ are defined by the following equations:

$$M_n = \Sigma n_i M_i / \Sigma n_i$$

$$M_w = \Sigma n_i (M_i)^2 / \Sigma n_i M_i$$

$$M_Z = \Sigma n_i (M_i)^3 / \Sigma n_i (M_i)^2$$

(M: molecular weight; n: number of moles)

In the case of a thermoplastic resin composition comprising rubber-reinforced thermoplastic resin (A), the above-specified $M_w/M_n$ ratio and $M_Z/M_n$ ratio can be achieved by properly regulating the combination and mixing ratios of two or more types of rubber-reinforced thermoplastic resin (A) differing in intrinsic viscosity of acetone soluble matter. Also, in the case of a thermoplastic resin composition comprising rubber-reinforced thermoplastic resin (A) and copolymer (B), the above-specified $M_w/M_n$ ratio and $M_Z/M_n$ ratio can be attained by properly regulating the combination and mixing ratios of the said different types of rubber-reinforced thermoplastic resin (A) as well as its combination with copolymer (B) and their mixing ratios. Further, the above-defined $M_w/M_n$ ratio and $M_Z/M_n$ ratio of the acetone soluble matter of the rubber-reinforced thermoplastic resin (A) can be adjusted by specifying the polymerization conditions, for example, by using a molecular weight modifier and an emulsifier stepwise during polymerization of the rubber-reinforced thermoplastic resin (A). In the case of the thermoplastic resin composition comprising the rubber-reinforced thermoplastic resin (A) and copolymer (B), the $M_w/M_n$ ratio and $M_Z/M_n$ ratio are adjusted preferably by combining the rubber-reinforced thermoplastic resin (A) and two or more types of the copolymer (B). In this case, as the copolymer (B), it is preferable to use a mixture of copolymer (B) having $M_w$ of 50,000 to 110,000, preferably 70,000 to 105,000 (hereinafter referred to as copolymer B1) and a copolymer (B) having $M_w$ of 115,000 to 400,000, preferably 120,000 to 300,000 (hereinafter referred to as copolymer B2) is used. In the above combination, the ratio of copolymer B1:copolymer B2 by weight is 1:0.5 to 10, preferably 1:1 to 5.

The content of the acetone soluble matter in the thermoplastic resin composition according to the present invention is preferably 40 to 88% by weight, more preferably 45 to 85% by weight, especially 50 to 85% by weight. When the content of the acetone soluble matter is too low, the molded article may be poor in plate adhesion and coating appearance. When the content of the acetone soluble matter is too high, the molded article may be poor in impact resistance.

In the thermoplastic resin composition of the present invention, various types of additives such as lubricant, flame retardant, coupling agent, antibacterial agent, mildew proofing agent, antioxidant, weathering (light) stabilizer, plasticizer, colorant (pigment, dye, etc.), antistatic agent, silicone oil, etc., may be contained in an amount as far as it does not adversely affect to the aimed properties.

The thermoplastic resin composition of the present invention may further contain, if necessary, one or more of fillers such as glass fiber, carbon fiber, wollastonite, talc, mica, kaolin, glass beads, glass flakes, milled fiber, zinc oxide whisker, potassium titanate whisker, etc. By addition of these fillers, rigidity can be imparted to the resin composition. By blending of talc or the like, matte effect can be provides imparted to the resin composition.

Further, in the thermoplastic resin or the thermoplastic resin composition of the present invention, it is possible to blend other (co)polymers according to the required performance of the resin composition. Examples of such (co)

polymers include maleimide-based copolymers, polycarbonates, polyethylenes, polypropylenes, polyamides, acrylic resins, polyesters, polysulfone, polyethersulfone, polyphenylene sulfide, liquid crystal polymers, polyvinylidene fluoride, styrene-vinyl acetate copolymer, polyamide elastomers, polyamide-imide elastomers, polyester elastomers, phenol resins, epoxy resins, and novolak resins.

The thermoplastic resin composition of the present invention can be produced by mixing and kneading the component materials by suitable means such as various types of extruder, Banbury mixer, kneader, roll mill, feeder ruder, etc. A method using an extruder or Banbury mixer is preferably used. In mixing and kneeding the component materials, they may be mixed all together or may be added and mixed in several portions. Mixing and kneeding may be effected according to a multiple stage addition system using an extruder, or the materials may be mixed by a Banbury mixer, kneader or the like means and then pelletized by an extruder.

The thermoplastic resin composition of the present invention may be molded into a variety of articles by various molding methods such as injection molding, sheet extrusion, vacuum molding, profile molding, expansion molding, injection press, press molding, blow molding, etc.

The molded articles obtained by these molding methods have excellent impact resistance, plate adhesion and coating properties, and find particularly useful application to the fields of exterior and interior trim parts of vehicles, electrical and OA equipment parts, and such.

These molded articles can be further subjected to secondary processing such as coating, plating, sputtering, ion plating, vacuum deposition, etc. Especially, when plating is applied, the molded articles show good plate adhesion, and when coated, the molded articles demonstrate excellent coating film adhesion and good appearance of the coat.

The thermoplastic resin composition of the present is capable of providing the molded articles having excellent impact resistance and also improved in both plate adhesion and coating properties in which the conventional thermoplastic resins were defective. Thus, the resin of the present invention is industrially useful as a molding material for the articles which are to be plated, coated or both plated and coated.

EXAMPLES

The present invention will hereinafter be described in further detail by showing the examples thereof, but it is to be understood that the present invention is not limited in its scope by these examples. In the following Examples and Comparative Examples, all "parts" and "%" are by weight unless otherwise noted.

1. Evaluation Methods

The evaluation methods used in the Examples and the Comparative Examples are as described below.

(1) Particle Size of Rubber-like Polymers:

The particle size of the latex-like rubber-like polymers was measured by the laser Doppler/frequency analysis using a particle size analyzer Microtrack UPA 150 Model No. 9340 mfd. by Nikkiso Co., Ltd. It was confirmed that the size of the rubber-like polymer particles dispersed in the rubber-reinforced thermoplastic resin was substantially equal to the particle size of the rubber-like polymer in the latex.

(2) Gel Fraction (Toluene Insoluble Matter):
Explained in the text.

(3) Graft Ratio:
Explained in the text.

(4) Intrinsic Viscosity [η]:
Copolymer (B) was dissolved in methyl ethyl ketone, and 5 samples differing in concentration from each other were prepared. Using an Ubbellohde viscometer, reduced viscosity at each concentration was measured at 30° C. and intrinsic viscosity [η] was determined from the result of measurement and expressed in unit of dl/g.

(5) Determination of Molecular Weight of Acetone Insoluble Matter and Copolymer (B) in Thermoplastic Resin Composition:

0.02 g of the acetone soluble matter produced from acetone extraction of the thermoplastic resin at normal temperature or copolymer (B) was dissolved in 10 ml of THF and filtered by a pretreatment disc for liquid chromatography, and the molecular weight distribution was measured by gel permeation chromatography (GPC). Calibration curves were prepared by using standard polystyrene samples. The solution was passed through two directly connected columns of TSK Gel Multipore HXL-M mfd. by Toso Co., Ltd., and the elute was measured as THF at a column temperature of 40° C. using an RI detector. Based on the molecular weight distribution defined by the obtained GPC curve, the number-average molecular weight ($M_n$), weight-average molecular weight ($M_w$) and Z-average molecular weight ($M_Z$) were calculated from the above-mentioned formulae of $M_n$, $M_w$ and $M_Z$. The $M_w/M_n$ ratio and the $M_Z/M_n$ ratio were also calculated. Further, $M_w$ of the copolymer (B) was determined in the same way.

(6) Content of Vinyl Cyanide Monomeric Units in Acetone Soluble Matter of Thermoplastic Resin:

The amount of nitrogen was determined by elemental analysis, and the content of the vinyl cyanide monomeric units was calculated from the determined amount of nitrogen.

(7) Plate Adhesion:

150 mm×90 mm×3 mm test pieces were molded from the thermoplastic resin composition of the present invention.

Each test piece was immersed in a 50° C. degreased solution for 4 to 5 minutes and then washed with pure water. The test piece was then immersed in a 68° C. mixed solution of 400 g/L of 98% sulfuric acid and 400 g/L of chromic anhydride for 10 to 20 minutes and then washed with pure water. Next, this test piece was immersed in 23° C. 10% hydrochloric acid for 2 minutes and then washed with pure water. The test piece was further immersed in a 20° C. aqueous solution of palladium chloride, stannous chloride and hydrochloric acid for 2 minutes and then washed with pure water. Then the test piece was immersed in a 35° C. 10% sulfuric acid for 3 minutes and then washed with pure water. The test piece was further immersed in a 35–40° C. aqueous solution of nickel sulfate, sodium citrate, sodium hypophosphite, ammonium chloride and aqueous ammonia for 5 minutes and then washed with pure water. This test piece was dried at 80° C. for about 2 hours, then immersed in a 20° C. aqueous solution of copper sulfate, sulfuric acid and a brightener at a current density of 3 A/dm$^2$ for 120 minutes to provide electroplating on the test piece, then washed with pure water, dried at 80° C. for 2 hours and further dried well at normal temperature. This process formed an about 80 μm thick plating deposit.

The plating deposit formed on the test piece was cut to a predetermined width (10 mm) in parallel and plate adhesion was determined by stripping it off the test piece at an angle of 90°.

(8) Coating Properties:

160 mm×100 mm×3 mm test pieces were molded from the thermoplastic resin composition. Each test piece was spray coated with a commercial urethane coating material (trade name "Soflex" mfg. by Kansai Paint Co., Ltd.) so that the post-drying coating thickness would become 50 to 75 μm, and after drying, appearance of the coating surface and coating film adhesion were evaluated.

Coating appearance was evaluated according to the following three-grade rating system by visually observing the shading on the surface:
A: No shading.
B: Slight shading.
C: Heavy shading.

For evaluating coating film adhesion, each test piece was crosscut to form 1 mm×1 mm squares by a cutter knife and washed with water jets issued from a distance of 2 mm under a pressure of 200 kg/cm$^2$, and thereafter, the area of the coating film remaining on the test piece was measured. Coating properties were evaluated by the percentage of the area of the remaining coating film.

(9) Impact Resistance (Izod Impact Strength):
Determined according to ASTM D256 (using notched, ¼ inch thick test piece). Unit: j/m.

Referential Example 1 (Preparation of Rubber-Reinforced Thermoplastic Resin (A))

In a separable flask provided with a dropping bottle, a condenser, a nitrogen inlet and a stirrer, 40 parts (calcd. as solid matter) of polybutadiene rubber latex with a gel fraction of 86% and an average particle size of 290 nm as rubber-like polymer (a), 0.5 part of potassium rosinate and 100 parts of water were mixed. To this mixture, 10 parts of styrene, 2 parts of acrylonitrile, 0.1 part of t-dodecylmercaptan as molecular weight modifier and 0.2 part of cumene hydroperoxide as polymerization initiator were added. The mixed solution was heated to 70° C. and then 0.2 part of cumene hydroperoxide, 0.2 part of sodium pyrophosphate, 0.25 part of dextrose and 0.01 part of ferrous sulfate were added to carry out polymerization. One hour later, a mixture of 16 parts of styrene, 8 parts of acrylonitrile, 0.05 part of t-dodecylmercaptan, 40 parts of water and 0.05 part of cumene hydroperoxide was added dropwise over a period of 4 hours. One hour thereafter, a mixture of 16.5 parts of styrene, 7.5 parts of acrylonitrile, 0.3 part of t-dodecylmercaptan, 40 parts of water and 0.05 part of cumene hydroperoxide was added dropwise over a period of 4 hours, and then 0.1 part of cumene hydroperoxide, 0.1 part of sodium pyrophosphate, 0.13 part of dextrose and 0.005 part of ferrous sulfate were added to carry out another one-hour polymerization reaction.

On conclusion of the polymerization reaction, the reaction product was cooled. Polymerization conversion was 98%.

The obtained polymer was coagulated with sulfuric acid and neutralized with sodium hydroxide, with the slurry pH being adjusted to 2. The coagulated product was washed well with water and then dried to give a powdery rubber-reinforced thermoplastic resin (A).

This rubber-reinforced thermoplastic resin (A) had the following specifications: graft ratio, 55%; intrinsic viscosity [η] of acetone soluble matter (measured in methyl ethyl ketone at 30° C.), 0.45 dl/g; content of rubber-like polymer, 40.5 wt %; styrene monomeric unit, 42.5 wt %; acrylonitrile monomeric unit, 17 wt %.

Referential Example 2 (Copolymer (B))

An acrylonitrile-styrene copolymer comprising 70% by weight of styrene monomeric unit and 30% by weight of acrylonitrile monomeric unit and having Mw of 86,000 and an intrinsic viscosity [η] (measured in methyl ethyl ketone at 30° C.) of 0.40 dl/g was used as copolymer (B1).

Also, an acrylonitrile-styrene copolymer comprising 64% by weight of styrene monomeric unit and 36% by weight of acrylonitrile monomeric unit and having $M_w$ of 176,000 and an intrinsic viscosity [η] (measured in methyl ethyl ketone at 30° C.) of 0.80 dl/g was used as copolymer (B2).

Examples 1 to 3, Referential Example 3 and Comparative Examples 1 and 2

The materials were mixed at the formulations shown in Table 1 by a Henschel mixer for 3 minutes and extruded by a 50 mm vent-type extruder (Model NVC mfd. by Nakatani Machinery Co., Ltd.) at a cylinder temperature of 180 to 220° C. to obtain pellets. These pellets were dried well and injection molded into the test pieces for various kinds of evaluation by an injection molding machine (Model J100E-C5 mfd. by Japan Steel Works, Ltd.) at a cylinder temperature of 200° C. and a mold temperature of 50° C. These test pieces were subjected to the above-described determination of Izod impact strength, plate adhesion test and coating properties test. Results are shown in Table 1.

TABLE 1

|  | Example 1 | Example 2 | Example 3 |
|---|---|---|---|
| Composition (wt %) | | | |
| Rubber-reinforced thermoplastic resin | 45 | 40 | 50 |
| Copolymer B1 | 15 | 35 | 30 |
| Copolymer B2 | 40 | 25 | 20 |
| Properties | | | |
| acetone soluble matter | | | |
| Weight-average molecular weight $M_w$ | $1.02 \times 10^5$ | $1.15 \times 10^5$ | $1.14 \times 10^5$ |
| Number-average molecular weight $M_n$ | $3.34 \times 10^4$ | $3.85 \times 10^4$ | $3.84 \times 10^4$ |
| Z-average molecular weight $M_z$ | $2.57 \times 10^5$ | $3.36 \times 10^5$ | $3.67 \times 10^5$ |
| $M_w/M_n$ | 3.1 | 3.0 | 3.0 |
| $M_z/M_n$ | 7.7 | 8.7 | 9.6 |
| Content of rubber-like polymer (a) | 18.2 | 16.2 | 20.3 |
| Content of the vinyl cyanide monomeric unit in the acetone soluble matter | 26.6 | 26.9 | 24.7 |
| Evaluation | | | |
| Izod impact strength (J/m) | 313 | 294 | 372 |
| Plate adhesion | 1.5 | 1.2 | 1.6 |
| Coating adhesion | | | |
| Coating properties (1) | 100 | 100 | 100 |
| Coating appearance (2) | A | A | A |

|  | Ref. Example 3 | Comp. Example 1 | Comp. Example 2 |
|---|---|---|---|
| Composition (wt %) | | | |
| Rubber-reinforced thermoplastic resin | 60 | 45 | 45 |
| Copolymer B1 | — | 55 | — |
| Copolymer B2 | 40 | — | 55 |
| Properties | | | |
| acetone soluble matter | | | |
| Weight-average molecular weight $M_w$ | $1.31 \times 10^5$ | $8.46 \times 10^4$ | $1.45 \times 10^5$ |
| Number-average molecular weight $M_n$ | $4.46 \times 10^4$ | $2.77 \times 10^4$ | $4.92 \times 10^4$ |

TABLE 1-continued

| | | | |
|---|---|---|---|
| Z-average molecular weight $M_Z$ | $4.76 \times 10^5$ | $1.22 \times 10^5$ | $5.81 \times 10^5$ |
| $M_w/M_n$ | 2.9 | 3.1 | 2.9 |
| $M_Z/M_n$ | 10.7 | 4.4 | 11.9 |
| Content of rubber-like polymer (a) | 24.3 | 18.2 | 18.2 |
| Content of the vinyl cyanide monomeric unit in the acetone soluble matter | 24.0 | 27.5 | 24.2 |
| Evaluation | | | |
| Izod impact strength (J/m) | 429 | 225 | 352 |
| Plate adhesion | 1.4 | 0.6 | 0.8 |
| Coating adhesion | | | |
| Coating properties (1) | 60 | 80 | 100 |
| Coating appearance (2) | C | A | C |

As seen from Table 1, the molded article of Comparative Example 1, in which the $M_Z/M_n$ ratio exceeded the range of the present invention, was unsatisfactory in plate adhesion and coating properties. The molded article of Comparative Example 2, in which the $M_Z/M_n$ ratio was below the range of the present invention, was also poor in plate adhesion and coating properties.

In contrast, Examples 1 to 3 all showed good results in impact resistance, plate adhesion and coating properties (coating film adhesion and appearance).

What is claimed is:

1. A thermoplastic resin composition comprising:
    a rubber-reinforced thermoplastic resin (A) obtained by graft polymerizing a monomeric mixture (b) comprising an aromatic vinyl compound, a vinyl cyanide compound and optionally other copolymerizable monomeric compound(s) in the presence of a rubber-like polymer (a), and
    a copolymer (B) obtained by polymerizing an aromatic vinyl compound, a vinyl cyanide compound and optionally other copolymerizable monomeric compound(s),
    the content of the rubber-like polymer (a) in the rubber-reinforced thermoplastic resin (A) being 10 to 25% by weight,
    the content of the vinyl cyanide monomeric unit in the acetone soluble matter being 15 to 40% by weight,
    the ratio of weight-average molecular weight Mw to number-average molecular weight $M_n$ of said acetone soluble matter ($M_w/M_n$ ratio) being 2 to 5,
    the ratio of Z-average molecular weight $M_Z$ to number-average molecular weight $M_n$ of said acetone soluble matter ($M_Z/M_n$ ratio) being 5 to 11,
    said copolymer (B) comprising a mixture of a copolymer (B1) having $M_w$ of 50,000 to 110,000 and a copolymer (B2) having $M_w$ of 115,000 to 400,000, and
    said copolymers (B1) and (B2) are obtained by polymerizing an aromatic vinyl compound, a vinyl cyanide compound and optionally other copolymerizable monomeric compound(s).

2. A thermoplastic resin composition according to claim 1, wherein the copolymer (B) is one obtained by polymerizing 15 to 50% by weight of a vinyl cyanide compound and 0 to 35% by weight of other copolymerizable monomeric compound(s).

3. A thermoplastic resin composition according to claim 1, wherein the rubber-reinforced thermoplastic resin (A) is obtained by graft polymerizing 25 to 90 parts by weight of a monomeric mixture (b) comprising 55 to 90% by weight of an aromatic vinyl compound, 10 to 45% by weight of a vinyl cyanide compound and 0 to 35% by weight of other copolymerizable monomeric compound(s) in the presence of 10 to 75 parts by weight of a rubber-like polymer (a).

4. A thermoplastic resin composition according to claim 1, wherein the content of the acetone soluble matter is 40 to 88% by weight.

5. A thermoplastic resin composition according to claim 1, wherein the weight ratio of copolymer B1:copolymer B2 is 1:0.5 to 10.

6. A molded article comprising the thermoplastic resin composition as defined in claim 1, said molded article being plated or coated.

7. A thermoplastic resin composition according to claim 1, wherein the weight ratio of copolymer B1:copolymer B2 is 1:1 to 5.

* * * * *